United States Patent [19]

van Broekhoven

[11] Patent Number: 4,929,701

[45] Date of Patent: May 29, 1990

[54] HYDROGENATION OF CO/OLEFIN COPOLYMER

[75] Inventor: Johannes A. M. van Broekhoven, Amsterdam, Netherlands

[73] Assignee: Shell Oil Company, Houston, Tex.

[21] Appl. No.: 325,793

[22] Filed: Mar. 20, 1989

[30] Foreign Application Priority Data

Mar. 21, 1988 [NL] Netherlands .................. 8800699

[51] Int. Cl.$^5$ ............................................. C08G 67/02
[52] U.S. Cl. ...................................... 525/539; 528/392
[58] Field of Search ............... 525/539; 528/341, 392; 526/270

[56] References Cited

U.S. PATENT DOCUMENTS

| | | | |
|---|---|---|---|
| 2,808,392 | 10/1957 | Hachihama et al. | 528/341 |
| 3,694,412 | 9/1972 | Nozaki | 260/63 CQ |
| 3,979,373 | 9/1976 | Kiovsky et al. | 526/12 |
| 4,385,159 | 5/1983 | Gruber | 526/270 |

FOREIGN PATENT DOCUMENTS

| | | |
|---|---|---|
| 121965 | 10/1984 | European Pat. Off. . |
| 181014 | 5/1986 | European Pat. Off. . |
| 222454 | 5/1987 | European Pat. Off. . |
| 257663 | 3/1988 | European Pat. Off. . |

Primary Examiner—Harold D. Anderson
Attorney, Agent, or Firm—Dean F. Vance

[57] ABSTRACT

Linear alternating polymers of carbon monoxide and at least one ethylenically unsaturated hydrocarbon are hydrogenated in the presence of a catalyst formed from a ruthenium carbonyl and an organic iodide to produce novel alternating polymers wherein one monomeric unit is a two-carbon unit optionally substituted with a methyl group and the other monomeric unit is a 2,5-tetrahydrofurandiyl unit optionally substituted on one of the carbon atoms in the 3 or 4 positions with a methyl group.

11 Claims, No Drawings

HYDROGENATION OF CO/OLEFIN COPOLYMER

FIELD OF THE INVENTION

This invention relates to certain novel, linear alternating polymers containing cyclic moieties and to a method for their production. More particularly, the invention relates to linear alternating polymers wherein hydrocarbon moieties having monomeric two-carbon connecting units alternate with a 2,5-tetrahydrofurandiyl moiety.

BACKGROUND OF THE INVENTION

Polymers produced from carbon monoxide and one or more olefins have been known for some time. Brubaker, U.S. Pat. No. 2,495,286, produced such polymers of relatively low carbon monoxide content in the presence of free radical initiators, e.g., peroxy compounds. The polymers of Brubaker were of a random rather than a linear alternating structure. Linear alternating polymers of carbon monoxide and olefin(s) were produced by Nozaki in the presence of arylphosphine moieties of palladium and certain inert solvents. See, for example, U.S. Pat. No. 3,694,412. More recent procedures for the production of linear alternating polymers of carbon monoxide and at least one ethylenically unsaturated hydrocarbon are illustrated by a number of published European Patent Applications including 121,965, 181,014, 222,454 and 257,663.

The production of linear alternating polymers, now known as polyketones or polyketone polymers, is conventionally accomplished by contacting the monomeric reactants in the presence of a catalyst composition formed from a Group VIII metal selected from palladium, cobalt or nickel, the anion of a non-hydrohalogenic acid having a pKa below about 6, preferably below 2, and polydentate ligand of phosphorus, arsenic or antimony. Although the scope of the polymerization is extensive, a preferred catalyst composition is formed from a palladium salt, particularly a palladium alkanoate such as palladium acetate, the anion of trifluoroacetic acid or p-toluenesulfonic acid, and a bidentate or tridentate ligand of phosphorus.

Interest in the polyketone polymers as well as in the derivatives thereof, has increased with the greater availability of the polymers. Various attempts have been made to derivatize the polymers including the hydrogenation of the carbonyl groups of the polymers to produce a polyol having structured similarity to a polyvinyl alcohol. In the above Brubaker patent, hydrogenation of random copolymers is disclosed. In a copending U.S. Pat. application, Ser. No. 138,767, filed Dec. 29, 1977, a process of hydrogenation is disclosed which does result in production of a polyol from a linear alternating polymer. Kiovsky et al, U.S. Pat. No. 3,979,373, describes a process where a linear alternating copolymer of carbon monoxide and ethylene is treated with a strong acid to convert a portion of the monomeric units into furan groups, thereby lowering the melting point of the polymer and improving processability. It would be of advantage, however, to provide additional derivatives of the linear alternating polymers of carbon monoxide and at least one ethylenically unsaturated hydrocarbon.

SUMMARY OF THE INVENTION

The present invention provides a novel class of linear alternating polymers wherein hydrocarbyl groups having two carbon units in the polymeric chain alternate with 2,5-tetrahydrofurandiyl moieties. Such polymers are produced by hydrogenating a linear alternating polymer of carbon monoxide and at least one ethylenically unsaturated hydrocarbon in the presence of a catalyst formed from a ruthenium carbonyl and an organic iodide. The process also involved dehydration of likely intermediates formed.

DESCRIPTION OF THE INVENTION

The novel polymers of the invention are produced by hydrogenation/dehydration of a linear alternating polymer of carbon dioxide and at least one ethylenically unsaturated hydrocarbon. Although a number of such polyketone polymers are useful as starting materials in the process of the invention, the preferred polyketone reactants are represented by the formula

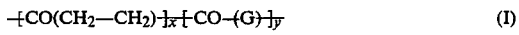

$$\text{—[CO(CH}_2\text{—CH}_2\text{)]}_x\text{—[CO—(G)]}_y\text{—} \quad (I)$$

wherein G is a moiety of an α-olefin having from 3 to 10 carbon atoms inclusive polymerized through the ethylenic unsaturation. The —CO—(CH$_2$—CH$_2$)— units and —CO—(G)— units are found randomly throughout the polymer chain and the ratio of y:x is no more than about 0.5. In the embodiment of the process of the invention where copolymer of carbon monoxide and ethylene is employed, the polymer is represented by the above formula wherein y is 0. When y is other than 0, i.e., terpolymer is employed as the starting material, ratios of y:x from about 0.01 to about 0.1 are preferred. Also preferred, when terpolymers are employed, are terpolymers of the above formula wherein G is a moiety of propylene, i.e., terpolymers of carbon monoxide, ethylene and propylene. Especially preferred as the polyketone starting material, however, is a copolymer of carbon monoxide and ethylene.

The polyketone polymer starting material is produced by methods which are now becoming conventional as illustrated by the above published European Patent Applications. The monomers are contacted under polymerization conditions in an inert reaction diluent in the presence of a catalyst composition formed from a palladium salt, the anion of a strong non-hydrohalogenic acid and a polydentate ligand of phosphorus. A palladium alkanoate and particularly palladium acetate is a preferred catalyst composition precursor as is the anion of trifluoroacetic acid or p-toluenesulfonic acid. The ligands 1,3-bis(diphenylphosphino)propane, 2-methyl-2-(diphenylphosphinomethyl)-1,3-bis(-diphenylphosphino)propane and 1,3-bis[di(2-methoxyphenyl)phosphino]-propane are illustrative of the suitable phosphorus ligands. Reaction diluents that are satisfactory include alkanols such as methanol or ethanol, lower alkanones such as acetone and methyl ethyl ketone, or mixtures thereof. Typical polymerization conditions include a reaction temperature of from about 40° C. to about 120° C. and a reaction pressure from about 20 bar to about 150 bar. Sufficient catalyst composition is employed to provide from about 1×10$^{-7}$ mol to about 1×10$^{-3}$ mol of palladium per mole of total hydrocarbon to be polymerized with the anion being provided in a quantity of from about 0.5 mol to about 50 mols per mol of palladium and the ligand being provided in a quantity of from about 0.5 mol to about 2 mol per mol of palladium. The polyketone product is obtained as a suspension in the reaction diluent and is recovered by filtration or other conventional methods. The polymer is used as such in the process of the invention or is purified if desired by treatment with a soluent or a complexing agent which is selective for catalyst composition residues.

The hydrogenation process of the invention which results in the production of the novel alternating polymers comprises contacting the linear alternating polymer of carbon monoxide and at least one ethylenically unsaturated hydrocarbon with elemental hydrogen, in the presence of a particular catalyst system, in an inert reaction diluent. The precise nature of the catalytic species is not known with certainty but the catalysts useful in the process of the invention are complex catalysts formed from a ruthenium carbonyl and an organic iodide. Ruthenium carbonyls are known compounds and ae suitably provided to the catalyst mixture as such. In an alternate modification, however, the ruthenium carbonyl is formed in situ as by supplying the ruthenium moiety as a compound other than the carbonyl but conducting the hydrogenation in the presence of carbon monoxide as well as the elemental hydrogen. Compounds of ruthenium that are soluble in the reaction mixture are useful as the in situ source of the ruthenium component with ruthenium (III) acetylacetonate being a preferred ruthenium source. The organic iodide catalyst component is preferably a soluble, liquid alkyl iodide and methyl iodide, ethyl iodide and propyl iodide are satisfactory. A particularly preferred organic iodide is methyl iodide. The ruthenium carbonyl and the organic iodide are employed in catalytic quantities. The quantity of ruthenium to be employed is from about 0.0005% by weight to about 1% by weight, based on polymer to be hydrogenated. Preferred quantities of ruthenium are from about 0.005% by weight to about 0.5% by weight on the same basis. The alkyl iodide is employed in a quantity of from about 1 ml per gram of ruthenium to about 20 ml per gram of ruthenium, preferably from about 5 ml to about 15 ml of alkyl iodide per gram of ruthenium.

It is useful, on some occasions, to employ other catalyst components. A triarylphosphine oxide is optionally added to the catalyst mixture to promote the hydrogenation process. Triphenylphosphine oxide is preferred and, if employed, is employed in approximately equal quantities by weight with the source of the ruthenium catalyst component. It is also useful, on occasion, to add an acid to promote the dehydrogenation character of the complex ruthenium catalyst. Acetic acid is preferred for such a purpose, and is typically employed in an amount of from about 1 gram to about 50 grams per gram of ruthenium moiety.

The hydrogenation process is conducted in an inert reaction diluent which is capable of dissolving at least a portion of the catalyst components. Alcohols are suitable as the reaction diluent, particularly the class of alkyl monoether derivatives of ethylene glycol known as oxitols. Methyl oxitol or 2-methoxyethanol is a particularly preferred reaction diluent. The diluent, the polymer reactant and the catalyst components are typically changed to a reactor and maintained under hydrogenation conditions of elevated temperature and pressure. Suitable reaction temperatures are from about 75° C. to about 200° C., preferably from about 100° C. to about 175° C. The reaction pressures that are useful are pressures from about 5 bar to about 300 bar, of which the hydrogen partial pressure is from about 5 bar to about 200 bar. The hydrogenated polymer product is generally obtained as a product at least substantially insoluble in the reaction diluent and is separated therefrom by conventional methods such as extraction or filtration. A preferred method of recovery comprises the treatment of the product with a solvent which is selective fro the catalyst and/or any solvent in the product mixture. The hydrogenated product is the residue from such an extraction.

The product of the invention is a linear alternating polymer having, as one type of unit, a two-carbon connecting unit within the polymeric chain, i.e., a —C—C— unit. In the case of carbon monoxide/ethylene copolymer starting materials, the unit is substituted only with hydrogen atoms, i.e., the unit is —CH$_2$—CH$_2$—. In the case of the propylene moieties of a carbon monoxide/ethylene/propylene terpolymer, the two-carbon connecting unit of the polymeric chain will have a pendant methyl substituent. Expressed differently, the monomeric two-carbon connecting unit of the polymer chain will be of the formula

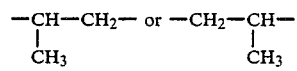

depending on the geometry of the polymerization process leading to the polyketone starting material. The other alternating unit is a 2,5-tetrahydrofurandiyl unit which, in the case of a carbon monoxide/ethylene copolymer is of the formula

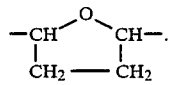

In the case of a carbon monoxide/ethylene/propylene terpolymer, the 2,5-tetrahydrofurandiyl unit will on random occasion contain a methyl substituent in the 3 or 4 position. In terms of the preferred polymeric starting materials of the above formula I, wherein G is a moiety of propylene, the polymric product of the hydrogenation process is a linear alternating polymer wherein (a) one unit is a two-carbon unit optionally substituted with one methyl substituent and (b) one unit is a 2,5-tetrahydrofurandiyl unit optionally substituted in the 3 or 4 position with a methyl substituent. When the preferred carbon monoxide/ethylene copolymers are employed as the polymeric starting material, the polymeric product will not have methyl substituents and will be of the repeating formula

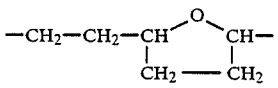

An analogous formula for the product derived from carbon monoxide/ethylene/ propylene terpolymer will have a methyl substituent on one of the carbons of the two-carbon unit and one of the carbon atoms of the cyclic unit in the 3 or 4 positions.

The products of the invention are thermoplastic materials and are useful in applications which are conventional for thermop)astic materials. The polymers are processed by known methods such as extrusion, injection molding or thermoforming into shaped articles such as sheets and films useful in the packaging industry and containers useful for food and drink.

The invention is further illustrated by the following Comparative Examples (not of the invention) and the following Illustrative Embodiments which should not be construed as limiting the invention.

Illustrative Embodiment I

A copolymer of carbon monoxide and ethylene was produced by changing 2 liters of methanol to a mechanically stirred autoclave of 4 liter capacity. After the autoclave and contents were heated to 65° C., ethylene and carbon monoxide were introduced to give partial pressures of 18 bar and 36 bar, respectively. A catalyst composition was then introduced into the autoclave which comprised 18 ml of methanol, 0.03 mmol of palladium acetate, 0.06 mmol of p-toluenesulfonic acid and 0.03 mmol of 2-methyl-2-(diphenylphosphinomethyl)-1,3-bis(diphenylphosphino)propane. The pressure was maintained at 55 bar during reaction by adding an equimolar mixture of ethylene and carbon monoxide. After 10 hours, the polymerization was terminated by cooling the autoclave and contents to room temperature and releasing the pressure. The product was recovered by filtration, washed with methanol and dried at 70° C. The yield of copolymer was 96 g, produced at a calculated rate of 3200 g of copolymer/g palladium hour. The $^{13}$C-NMR spectra were consistent with a linear polymer of alternating —CO— and —$C_2H_4$— units.

COMPARATIVE EXAMPLE I

To a mechanically stirred autoclave of 300 ml capacity was charged 100 ml of 2-methoxyethanol. Subsequently, 10 g of a catalyst comprising 50% nickel or a carrier and 10 g of the copolymer of Illustrative Embodiment I were added and the autoclave was flushed with nitrogen. Sufficient hydrogen was then added to give a pressure of 50 bar and the autoclave and contents were heated to 200° C. After 16 hours, the autoclave and contents were cooled to room temperature and the pressure was released. The product mixture was filtered to remove catalyst and unreacted polymer and water was added to precipitate 6 g of a polymer in the form of a white powder. The product was then dissolved in hexafluoroisopropanol and analyzed by $^{13}$C-NMR. The spectra obtained showed no carbonyl groups, but did show the presence of alcohol groups, polymethylene groups and ether groups. The product was a complex mixture of polymeric materials which did not have a linear alternating structure.

COMPARATIVE EXAMPLE II

The procedure of Comparative Example I was repeated except that 100 ml of o-cresol was employed instead of the 2-methoxyethanol and that 10 g of copper chronite was employed as the catalyst instead o: supported nickel. As shown by $^{13}$C-NMR analysis of the product, no significant hydrogenation had taken place.

COMPARATIVE EXAMPLE III

The procedure of Comparative Example I was repeated except that a homogeneous cobalt phosphine complex was provided as the catalyst instead of the supported nickel. Analysis of the mixture resulting from heating in the presence of hydrogen showed that no reaction had taken place.

Illustrative Embodiment II

To a mechanically stirred autoclave of 300 ml was added 100 ml of 2-methoxyethanol, 10 g of the polymer of Illustrative Embodiment I and a catalyst solution which comprised 10 ml of acetic acid, 0.2 g of ruthenium (acetylacetonate)$_3$, 0.2 g of triphenylphosphine oxide and 1 ml of methyl iodide. The autoclave was swept with nitrogen and carbon monoxide and hydrogen were added to give partial pressures of 15 bar and 40 bar, respectively. The autoclave and contents were heated to 150° C. and maintained at that temperature for 4 hours. Reaction was then terminated by cooling the autoclave and contents to room temperature and releasing the pressure. The product mixture, a viscous oil, was extracted with methanol to remove solvent and catalyst. The residue product was dried to afford a glassy material in a yield of 90%, based on the polymer added.

The elemental analysis and the $^{13}$C-NMR spectra were consistent with a linear polymer in which 1,2-ethylene and 2,5-tetrahydrofurandiyl units occurred in alternating order.

What is claimed is:

1. A process for producing a linear alternating polymer product wherein two-carbon monomeric units, optionally containing a methyl substituent, alternate with 2,5-tetrahydrofurandiyl units optionally containing a methyl substituent on one of the carbon atoms in the 3 or 4 positions which comprises hydrogenating under hydrogenation conditions a linear reactant linear alternating polymer of carbon monoxide and at least one α-olefin, in an inert reaction diluent, in the presence of a catalyst formed from a ruthenium carbonyl and an organic iodide.

2. The process of claim 1 wherein the reactant polymer is of the repeating formula

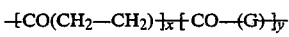

wherein G is a moiety of propylene polymerized through the ethylenic unsaturation and the ratio of y:x is no more than about 0.5.

3. The process of claim 2 wherein the ruthenium carbonyl is formed in situ from an added soluble ruthenium salt and carbon monoxide.

4. The process of claim 3 wherein the organic iodide is methyl iodide.

5. The process of claim 4 wherein the ratio of y:x is from about 0.01 to about 0.1.

6. The process of claim 7 wherein the added soluble ruthenium compound is ruthenium (III) acetylacetonate.

7. A process of producing a linear alternating polymer of —$CH_2$—$CH_2$— units and

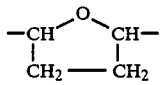

units by hydrogenating a linear alternating copolymer of carbon monoxide and hydrogen, in an inert reaction diluent, in the presence of a catalyst formed from a ruthenium carbonyl and an organic iodide.

8. The process of claim 7 wherein the ruthenium carbonyl is formed in situ from an added soluble ruthenium compound and carbon monoxide.

9. The process of claim 8 wherein the organic iodide is an alkyl iodide.

10. The process of claim 9 wherein the ruthenium compound is ruthenium (III) acetylacetonate.

11. The process of claim 10 wherein the alkyl iodide is methyl iodide.

* * * * *